United States Patent
Dorn et al.

(10) Patent No.: US 11,740,314 B2
(45) Date of Patent: Aug. 29, 2023

(54) METHOD, DEVICE, ARRANGEMENT AND SOFTWARE FOR DETERMINING THE ANGLE OF ARRIVAL (AOA) FOR LOCATING OBJECTS

(71) Applicant: safectory GmbH, Bamberg (DE)

(72) Inventors: Christian Dorn, Erlangen (DE); Stefan Erhardt, Möhrendorf (DE)

(73) Assignee: SAFECTORY GMBH, Bamberg (DE)

(*) Notice: Subject to any disclaimer, the term of this patent is extended or adjusted under 35 U.S.C. 154(b) by 433 days.

(21) Appl. No.: 16/696,750

(22) Filed: Nov. 26, 2019

(65) Prior Publication Data

US 2020/0166598 A1    May 28, 2020

(30) Foreign Application Priority Data

Nov. 27, 2018 (EP) .................................. 18208560.5

(51) Int. Cl.
   *G01S 3/48*      (2006.01)
   *G01S 3/02*      (2006.01)
   *H04W 4/02*      (2018.01)
   *H04W 4/029*     (2018.01)

(52) U.S. Cl.
   CPC ............ *G01S 3/48* (2013.01); *G01S 3/023* (2013.01); *H04W 4/029* (2018.02)

(58) Field of Classification Search
   CPC ... G01S 3/48; G01S 3/023; G01S 3/46; G01S 3/043; H04W 4/029
   See application file for complete search history.

(56) References Cited

U.S. PATENT DOCUMENTS

| | | | | |
|---|---|---|---|---|
| 5,497,161 A | * | 3/1996 | Tsui | G01S 3/043 324/76.23 |
| 9,989,633 B1 | * | 6/2018 | Pandey | G01S 13/42 |
| 2011/0260911 A1 | * | 10/2011 | Sapp | G01S 3/10 342/174 |
| 2018/0031671 A1 | * | 2/2018 | Alexander | G01S 5/06 |
| 2018/0203091 A1 | * | 7/2018 | Robinson | G01S 3/043 |

FOREIGN PATENT DOCUMENTS

| | | | | |
|---|---|---|---|---|
| EP | 2 799 895 A1 | 11/2014 | | |
| EP | 2799895 A1 | * 11/2014 | | G01S 19/04 |
| WO | 00/69198 A1 | 11/2000 | | |
| WO | WO-0069198 A1 | * 11/2000 | | G01S 5/0252 |

* cited by examiner

*Primary Examiner* — Erin F Heard
*Assistant Examiner* — Juliana Cross
(74) *Attorney, Agent, or Firm* — Merchant & Gould P.C.

(57) ABSTRACT

A method measures an angle of arrival (AOA) of an incoming signal using m separate antennas coupled via a switch with a single receiving device. The switch sequentially supplies the incoming signal to the receiver. A sampling of the incoming signal as received at the antennas has a sampling rate and cycle time performed in repetitive cycles. The receiver generates baseband signals with in-phase and quadrature components from the incoming signal and forwarding to each analog-to-digital converter to provide digitized samples. A signal processor is coupled to the respective analog-to-digital converter to analyze the digitized signals and to determine the angle of arrival of the incoming signal. The resulting phase error is compensated by sampling and signal processing. A device operates according to the method and an arrangement with a mobile transmitter and a device and software for locating the mobile transmitter by the device.

14 Claims, 6 Drawing Sheets

METHOD, DEVICE, ARRANGEMENT AND SOFTWARE FOR DETERMINING THE ANGLE OF ARRIVAL (AOA) FOR LOCATING OBJECTS

This application claims benefit of European Patent Application Serial No. 18208560.5, filed 27 Nov. 2018 and which application is incorporated herein by reference. To the extent appropriate, a claim of priority is made to the above disclosed application.

TECHNOLOGICAL BACKGROUND

As digitalization progresses, more and more attempts are made to connect the online and the offline world. Thus, objects and places from the real world must be connected with a virtual representation. Good knowledge of the position of objects in the real world is thus very important when it comes to a virtual integration of the physical object. The best-known effort in this field is the digitalization of the physical position of an object to enhance the user experience or to capture and track objects.

The Global Positioning System (GPS) offers one way to determine the position of objects. However, there are serious limitations if the system is to be used indoors because the high attenuation of GPS frequency bands by building materials requires highly sensitive receivers that are expensive and therefore not very common.

Radar systems are another option, but they are difficult to operate and expensive to make, so even though they offer high precision, they are not suitable for indoor navigation.

The best compromise between versatility and price is the reuse of technologies commonly used in radar applications on normal low-frequency HF systems. Many methods for measuring the distance and angle of the incoming radio waves can be used analogously in low-frequency HF bands. However, the most promising applications can only run on smartphones or other portable devices.

CLOSEST PRIOR ART

An apparatus for measuring an angle of arrival (AOA) is known from U.S. Pat. No. 5,497,161. It describes signal processing means that comprise the processing by means of FFT. In addition, the incoming signals are sampled by the plurality of antennas in a quasi-simultaneous manner by delay means, which requires the signal processing means to have a correspondingly higher sampling rate.

OBJECT OF THE PRESENT INVENTION

The object of the present invention is to provide a novel method, a device, an arrangement and software, which offer both an increased energy operating flexibility and an advantageous energy efficiency at reduced costs.

SOLUTION OF THE OBJECT

According to the invention, a method for measuring an angle of arrival (AOA) of an incoming signal is provided using m separate antennas, wherein m is an integer greater than one, wherein the antennas are coupled via switching means with a single receiving device, wherein the switching means comprise electronic means for sequentially supplying the incoming signal as it is received at the m antennas to the receiving means, wherein a sampling of the incoming signal as received at the m antennas having a sampling rate and cycle time is performed in repetitive cycles; wherein the receiving means comprises means for generating baseband signals with an in-phase component and with a quadrature component (IQ data) from the incoming signal and for forwarding these to each analog-to-digital converter to provide digitized samples for each of the m antennas in each cycle; wherein signal processing means are provided, which are coupled to the respective analog-to-digital converter to analyze the digitized signals and to determine the angle of arrival of the incoming signal, characterized in that the sampling rate of the signal processing means may be smaller than the number of m antennas multiplied by the minimum sampling rate that is necessary for a clear reconstruction of the input signals of the individual m antennas and in that the resulting phase error is compensated by multiple sampling of at least one antenna and signal processing by a statistical method.

One criterion for clearly reconstructing the input signals may be the Nyquist-Shannon sampling theorem. Accordingly, a signal limited to a maximum frequency $f_{max}$ can be exactly reconstructed from a sequence of equidistant sampled values if it has been sampled with a frequency greater than twice the maximum frequency $2f_{max}$.

To determine the phase of an antenna, a phase sequence $\varphi[n]$ may be calculated from the IQ data. Based on the phase sequence $\varphi[n]$, a statistical method may be used to compensate for a phase error that has arisen.

The resulting phase error may also be estimated by a multiple sampling of at least one antenna. To do so, the first antenna may, for example, be scanned for a double cycle time $t_z$. The phase may then be determined individually for each cycle time $t_z$, and the phase error is determined by $\varphi_{err} = \varphi_1 - \varphi_0$, with $\varphi_1$ and $\varphi_0$ representing the estimated phases for the intervals $t_1$ and $t_0$.

The method according to the invention thus makes it possible to use signal processing means with a lower sampling rate so that less expensive components are possible.

Alternatively, the sampling rate of the signal processing means may be less than the number of m antennas multiplied by the minimum sampling rate necessary to clearly reconstruct the input signals of the individual antennas m.

Advantageously, the statistical method may involve the use of a uniformly best unbiased estimator. When using an estimator, it is important to know how "good" the results of this estimator are. "Good" estimators have no systematic error, and their estimated value is generally closer to the estimated value than other unbiased estimators. The variance of an estimator may be used as a criterion for determining to a good estimator. Uniformly best unbiased estimators have the smallest variance among all unbiased estimators. An estimator that minimizes variance is therefore also referred to as a Uniformly Minimum Variance Unbiased (UMVU) estimator.

The Cramér-Rao inequality is a criterion for determining the best possible estimator. It is a standard that provides the minimum variance achievable for an estimation problem. It provides, in regular statistical models, an estimate for the variance of point estimators and thus a way to compare different estimators with each other and a criterion for the determination of uniformly best unbiased estimators.

It is particularly advantageous if a phase unwrapping is carried out in the signal processing means. By means of a mixer, a specific frequency band with a defined bandwidth of an incoming signal can be converted into a higher or lower frequency band. For this purpose, the respective frequency band is shifted from the carrier frequency $\omega_0$ of the incoming signal to $\omega = \omega_0 - \omega_{LO}$, with $\omega_{LO}$ being the frequency of the local oscillator, which is predetermined by the signal processing means. An accurate synchronization of the local oscillator with the carrier signal is difficult, however, so that in an imperfect synchronization, the phase rotates at a constant frequency $\omega_f$. In principle, the slope and the center point for the phase could be calculated with an algorithm, in particular with a regression algorithm. That may, however, lead to the problem of discontinuities, which occur, for example, due to the wrapping properties of the arctan 2-function. An algorithm that detects and eliminates the discontinuities in the phase is called a phase unwrapping algorithm. These types of algorithms detect phase shifts by $\pm 2\pi$ and add $\mp 2\pi$ accordingly to the subsequent samplings of the phase. After the unwrapping, the phase of the incident radio wave can be calculated by using an estimator for the regression problem. This estimator may be a uniformly best unbiased estimator.

Advantageously, incoming signals with different frequencies may be provided. Objects in the surroundings, which act as interferers at a given frequency, may no longer act as interferers at a different frequency. By using several different frequency bands, negative propagation properties such as fading effects are minimized, which improves the signal quality and ultimately the determination of the angle of arrival. Different frequencies can be used on different frequency bands. The m antennas, for example, may be operated in a dual band operation with two different frequency ranges.

It may also be expedient if the frequencies differ by at least a factor of 2, in particular by a factor of 3, in particular by a factor of 4. By making the difference in frequencies sufficiently large, the frequencies may advantageously be outside the respective coherence bandwidths. The coherence bandwidth describes the approximate maximum bandwidth or frequency interval at which two frequencies experience comparable or correlated attenuation. Due to the different coherence bandwidths, the frequencies are advantageously subjected to different attenuations or fading effects. When operating at two different frequencies, for example, the frequencies 868 MHz and 2.4 GHz may be used. The frequency 2.4 GHz, for example, is greater than the frequency 868 MHz by a factor of 2.

Advantageously, a distance d between at least two of the m antennas may correspond to at least half the wavelength of at least one incoming signal. The error in the determination of the angle of arrival (AOA) becomes greater the closer two of the m antennas are arranged to each other. In addition, it is advantageous if the distances of the m antennas are as close as possible to the wavelengths of the incoming signals. The frequency band around 868 MHz, for example, has a wavelength of $\lambda \approx 34.5$ cm and the frequency band around 2.4 GHz has a wavelength of $\lambda \approx 12.2$ cm. For lower frequency bands, for example the frequency band around 868 MHz, the largest possible distance d would be desirable. A large distance d, which is greater than the wavelength of the higher frequency band, may lead to ambiguities in the higher frequency band. A distance d selected for the frequency band around 868 MHz, for example, may lead to ambiguities in the frequency band around 2.4 GHz. However, it is possible to clearly resolve these ambiguities by using multiple frequency bands in a multi-band process.

Expediently, the electrical length of the m antennas may differ, and the compensation of the different electrical lengths of the m antennas may be performed in the signal processing means. If the electrical lengths of the m antennas are different, it is not necessary to compensate for them with hardware, for example in the form of delay lines. These delay lines could be quite long depending on the selected frequency, which would not be possible in a compact device. Due to the compensation in the signal processing means, different electrical lengths of the m antennas have no negative effects on the size of a device in which the method according to the invention is implemented.

To keep costs down, antennas on a printed circuit board antenna (PCB antenna) may be used. Since there is space for possible delay lines on a printed circuit board, compensation in the signal processing means provides a means of minimizing costs.

It is possible to estimate the angle for measuring an angle of arrival (AOA) for at least 2 of the m antennas. The phase difference $\Delta\varphi_{ij}$ of the incoming signals may be calculated for every 2 of the m antennas. The angle of arrival may correspondingly be calculated for 2 antennas by $$\psi_{ij} = \arcsin\left(\frac{\Delta\varphi_{ij} \cdot \lambda}{\pi \cdot \Delta d}\right),$$

with $\Delta d = d_{ij}$ being the distance between two antennas. This way, the individual angles of attack can be calculated for several or all pairings of the m antennas with the resulting angle of arrival then being calculated by means of an estimate, such as the determination of the mean value.

It is particularly useful if the estimate of the angle comprises the least-squares method. From the individual angles of arrival determined for several or all pairings of the m antennas, the resulting angle of attack can be calculated by means of the least-squares method.

In addition, a device comprises m separate antennas, wherein m is an integer greater than one, switching means and a receiving device, wherein the antennas are coupled with a single receiving device Via switching means. The switching means comprise electronic means for sequentially supplying the incoming signal, as received by the m antennas, to the receiving means, with a sampling of the incoming signal as received at the m antenna having a sampling rate and cycle time being performed in repetitive cycles. The receiving means comprises means for generating baseband signals having an in-phase component and a quadrature component from the incoming signal and forwarding the same to each analog-to-digital converter to provide digitized samples for each of the m antennas in each cycle. Further, signal processing means, which are coupled to the respective analog-to-digital converter, are provided for analyzing the digitized signals and determining the angle of arrival of the incoming signal, wherein the sampling rate of the signal processing means may be less than the number of m antennas multiplied by the minimum sampling rate, which is necessary for a clear reconstruction of the input signals of the individual antennas m and wherein the resulting phase error is compensated by multiple sampling of at least one antenna and signal processing by a statistical method.

Advantageously, the device may be operated with a self-sufficient energy source. The method according to the invention makes it possible to design the device such that particularly energy-saving components can be used. It is therefore possible to provide the device with self-sufficient energy over a longer period of time. The device can, therefore, also be operated in locations which do not provide a direct power connection, which offers a high degree of flexibility in terms of the place of operation.

Conveniently, the device may be part of a real-time localization system. Real-time localization describes the determination of the location of an object in an initially unknown location.

Advantageously, the device may comprise a system-on-a-chip (SoC) which comprises the receiving device and/or the signal processing means. As a result, the device can be dimensioned smaller and at the same time the energy consumption can be reduced. In addition, production can be simplified and made more cost-effective as fewer individual components are installed.

In addition, the present invention is directed to an arrangement for locating at least one mobile transmitter, in particular a smartphone or a wearable, by radio. Advantageously, the arrangement may comprise at least two, preferably at least three, devices. In the arrangement, it is possible to determine the angle of arrival of a signal transmitted by the mobile transmitter at the devices. The position of the mobile transmitter can be determined by triangulating the different angles of attack. The absolute positions of the devices or the relative positions of the devices with respect to the space are known.

Conveniently, the arrangement may comprise a central data processing unit which evaluates the determined angles of attack. The evaluation may include the position determination of the mobile transmitter by means of triangulation. It is possible for at least one device to be operated as a central data processing unit. The tasks of the central data processing unit can thus be taken over by at least one of the devices. A device which is not performing any measurements may be selected, for example, in order to further evaluate the determined angles of attack.

In addition, the present invention is directed to software, in particular in the form of an app, which is provided on the mobile transmitter, in particular a smartphone or a wearable, and which makes it possible to locate the mobile transmitter. This software can control the transmission of radio signals from the mobile transmitter to the devices. If the position of the mobile transmitter has been determined by the devices in the arrangement, this position can be sent to the mobile transmitter, where the software receives the position data and processes it for example for a user.

DESCRIPTION OF THE INVENTION ON THE BASIS OF EXEMPLARY EMBODIMENTS

Advantageous embodiments of the present invention will be explained in more detail below on the basis of the drawings. The figures show the following:

Figure 1:
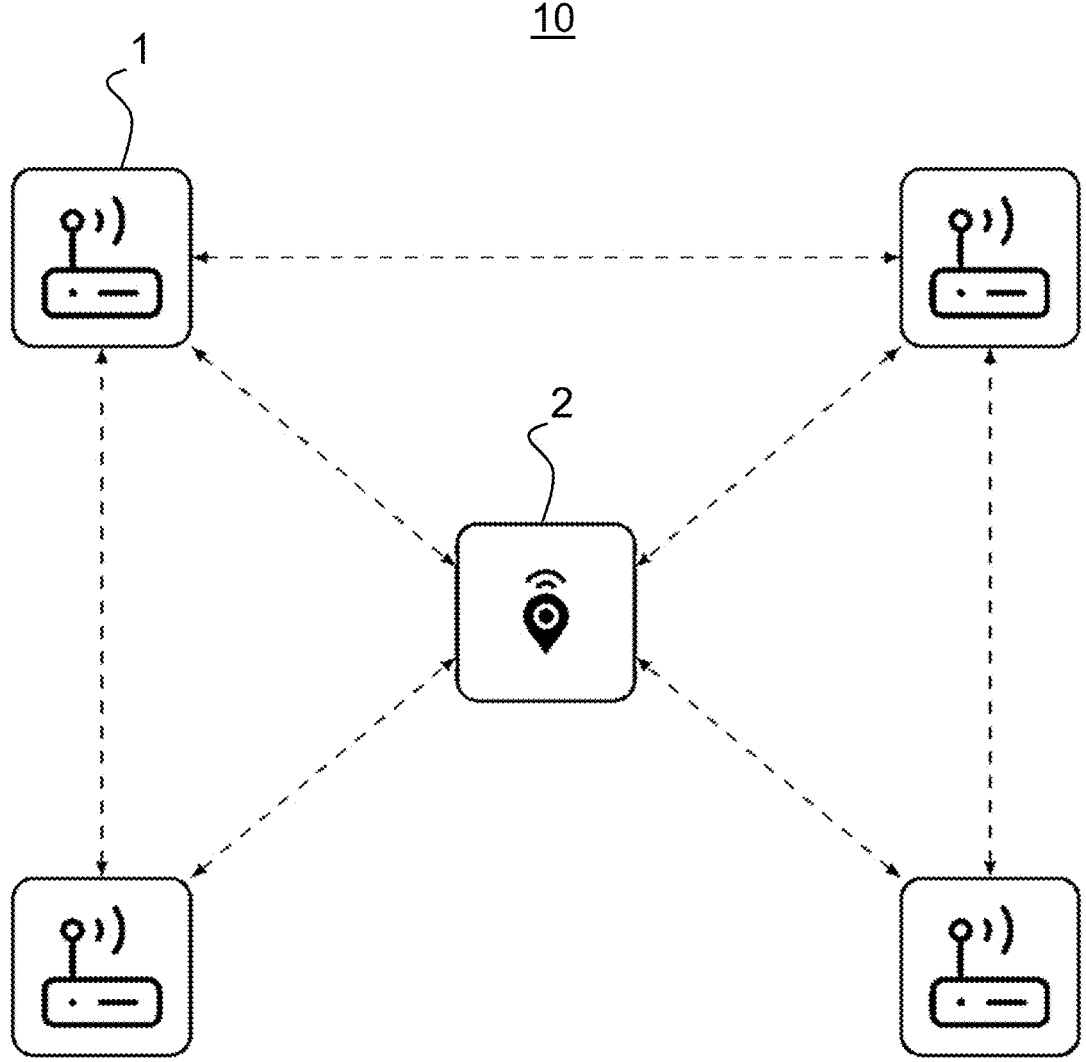
FIG. 1 shows an overview of an arrangement for locating a mobile transmitter.
Figure 1:
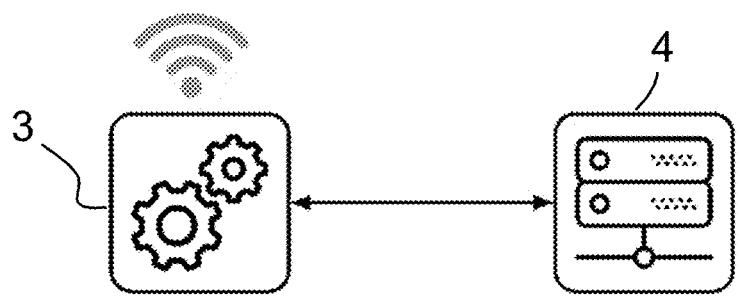

FIG. 1 shows an overview of an arrangement for locating a mobile transmitter. This overview shows the concept of the present invention. In this embodiment, the arrangement comprises four devices 1, one mobile transmitter 2 and a central data processing system 3, which is additionally in communication with a server 4.

All devices 1 communicate with each other via a radio connection. In addition, each device 1 is assigned a unique ID by which the respective device 1 can identify itself. The number of devices 1 that are necessary to locate a corresponding mobile transmitter 2 depends on the particular surroundings and must be evaluated empirically. It is therefore advantageous for determining the number of devices 1 to have a more accurate knowledge of the surroundings. Obstacles to the radio frequencies used may act as interferers, for example.

The mobile transmitter 2 emits radio signals, which are received by the individual devices 1 as incoming signals. By means of the incoming signals, the devices 1 calculate the angle of arrival (AOA) $\Psi$ on the basis of the method according to the invention. The calculation of the position of the mobile transmitter 2 in the space or relative to the installed devices 1 is carried out in a central data processing system 3. These calculations may also be carried out in one of the devices 1 itself so that no additional separate central data processing system 3 is required. If the calculation is carried out by one of the devices 1, one of the devices 1 can be automatically selected for this purpose, which, for example, is within range and at that time is not busy with performing measurements, making computing capacities available.

To ensure that the calculations of the position of the mobile transmitter 2 are accurate, the exact positions of the devices 1 must be known. In this regard, the respective positions of the devices 1 with respect to a certain reference point may be known. A further possibility consists in the fact that the position of a first device 1 with respect to a reference point and the respective relative position of the other devices 1 to the first device 1 are known. Floor plans of the building may then, for example, be superimposed on the position of the mobile transmitter 2.

Furthermore, a server 4, which communicates with the central data processing system 3 or with the device 1, which performs the calculations and receives and stores the measured positions of the mobile transmitter 2 for further evaluation, may be provided. A localization back end, for example, which allows access to the current and past locations of the mobile transmitter 2, could be operated.

The system may be designed so that the position determination is triggered by the mobile transmitter 2, either at the request of the user, e.g. with a keystroke, or periodically at certain times.

In order to allow for an accurate position calculation, the measurements of the phases and the angles of attack determined therefrom may be performed several times. In addition, to eliminate fading, shadowing and multipath propagation, measurements in two frequency bands may be performed consecutively.

Figure 2:
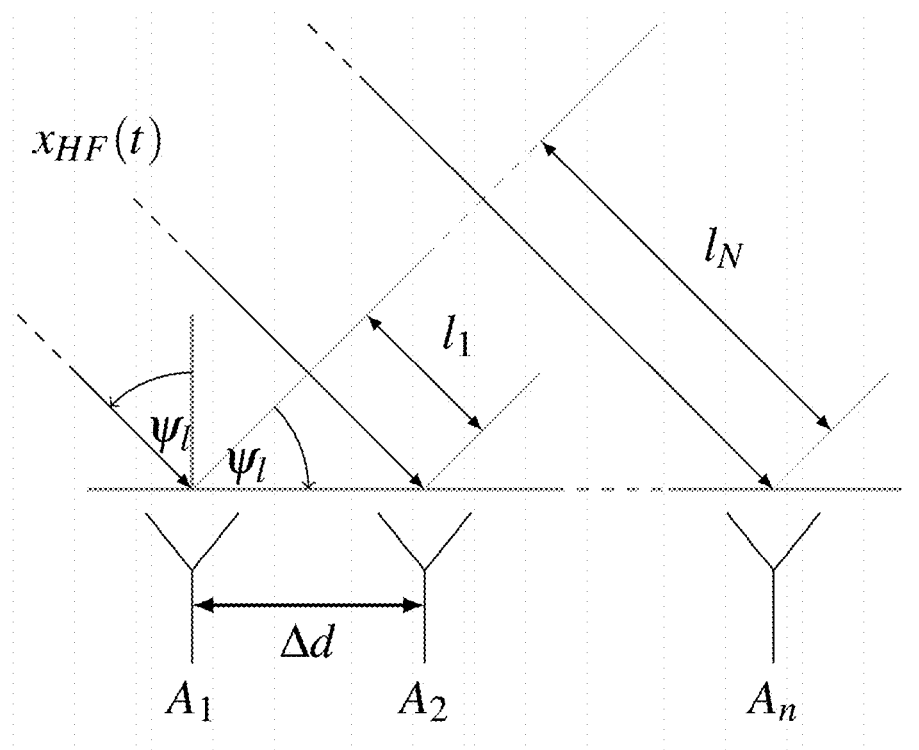
FIG. 2 shows a simplified schematic representation of n antennas with an incoming signal.

FIG. 2 shows a simplified schematic representation of n antennas with an incoming signal $x_{HF}$. One way to measure the angle of arrival is phase interferometry. This technique measures the phase of an incoming signal on different antennas. It requires an arrangement of antennas, which are arranged at a known distance from each other. The angle of arrival Ψ of the incoming signal $x_{HF}$ can be calculated by the relationship sin $$\psi = \frac{l}{\Delta d}.$$

If the distance between two antennas Δd is smaller than the wavelength of the signal $\lambda_{HF}$>Δd, the path difference l can be clearly determined by the phase difference Δφ of two signals from two antennas with $$l = \frac{\Delta \varphi}{\pi} \lambda_{HF}.$$

The angle of arrival of the two antennas A1 and A2 can be calculated by $$\psi = \arcsin\left(\frac{\Delta \varphi \cdot \lambda_{HF}}{\pi \cdot \Delta d}\right)$$

accordingly.

Figure 3:
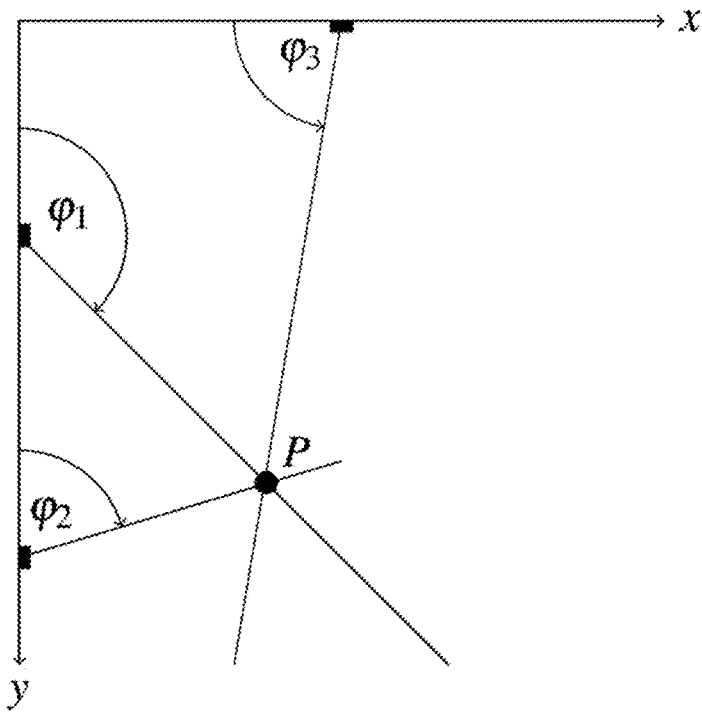
FIG. 3 shows an example of the triangulation in two dimensions.

In a three-dimensional space, it is not possible to determine a position (x, y, z) solely by an angle measurement in the φ direction corresponding to the spherical coordinates. Intersections of these angle measurements will always be independent of the z-axis. However, a position determination along the z-axis in closed rooms is usually not necessary since only small height differences are possible. However, one possibility would be to measure the θ direction according to the spherical coordinates when the devices 1 are mounted in different rotations. An example for a triangulation of a point or object in two dimensions is shown in FIG. 3. At least two angles $\varphi_1$ and $\varphi_2$ are necessary for the triangulation in two dimensions. The angle φ is a value between −90°<0°<90°, with 0° pointing in the direction of the x-axis. If the angle measurements φ are faulty, it may be necessary to perform further angle measurements with further devices 1, as indicated by the angle measurement $\varphi_3$.

Figure 4:
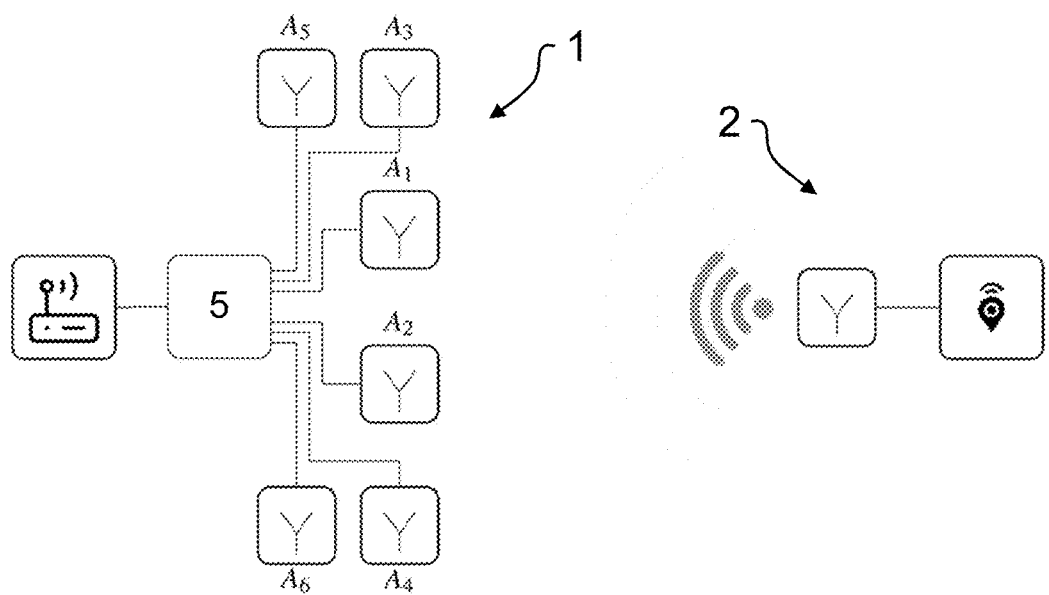
FIG. 4 shows a very simplified schematic representation of the measure concept.

FIG. 4 shows a very simplified schematic representation of the measurement concept. The embodiment shows a device 1 with six antennas A1 to A6, switching means 5 and further processing means, which may include the receiving device 6 and the signal processing means 7. The individual antennas A1 to A6 may be randomly selected by the switching means 5. A safety timer $t_{start}$ may also be provided prior to the actual measurement. During this time, all devices involved, for example further devices 1, may switch to a measurement mode. The mobile transmitter 2 emits a carrier wave at a predetermined frequency. After the delay $t_{start}$, the device 1 starts the measuring process. In this process, each antenna is selected, for example, for a previously defined measurement interval $t_m$: Antenna A1 is selected for the time 2·$t_m$ and the other antennas A2 to A6 for the time $t_m$. After the expiration of a time $t_{stop}$, the measurement in the device 1 or in other devices 1 is stopped. The selected time $t_{stop}$ is much longer than 7·$t_m$ in order to avoid problems with the synchronization. The mobile transmitter 2 then waits for a confirmation of the measurement by all devices 1 involved. If no or only partial confirmation by the devices 1 is received, the measurement is considered flawed.

Figure 5:
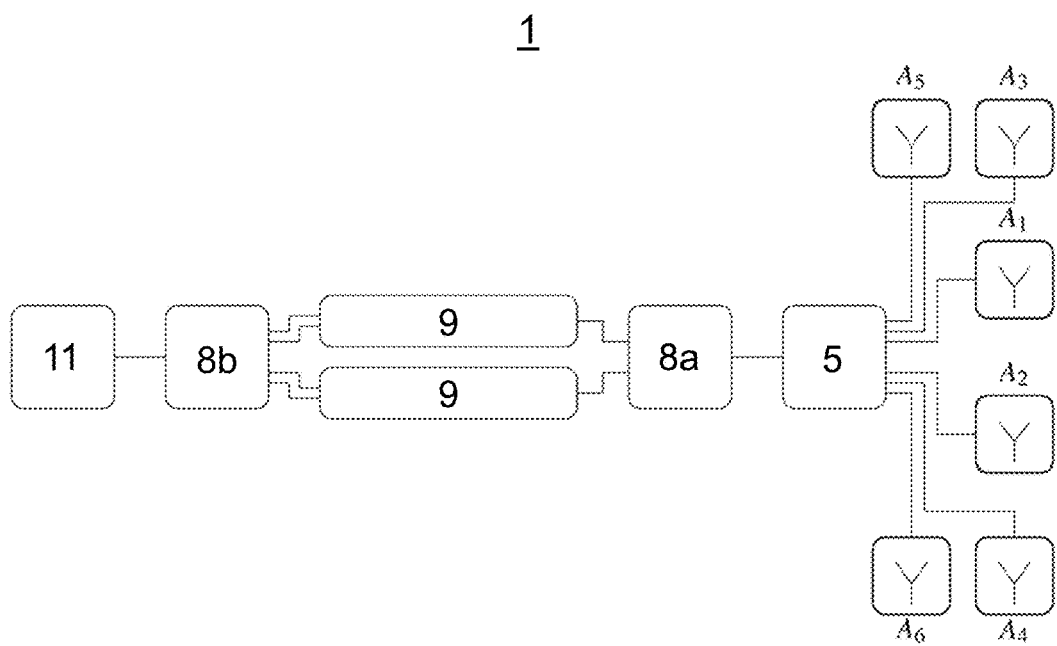
FIG. 5 shows a very simplified schematic representation of the RF front ends.

FIG. 5 shows a very simplified schematic representation of the RF front end. In this embodiment, six antennas A1 to A6 are shown, which are connected with the switching means 5. A first toggle switch 8a is connected downstream from the switching means 5. This toggle switch 8a is designed as a single-pole toggle switch (SPDT, single pole double throw). Subsequently, an impedance adjustment is performed for different frequency bands, for example an adjustment for two different frequency bands, such as 2.4 GHz and sub-1 GHz. A second toggle switch 8b is inserted after the impedance adjustment and before the system-on-a-chip 11, said switch being designed as a differential double-pole toggle switch (DPxDT, double pole double throw crossed). It is advantageous that all switches have a minimum insertion loss in order to avoid high attenuation and thus to keep the signal-to-noise ratio (SNR) high. The further data processing is carried out on the system-on-a-chip 11, which means that the system-on-a-chip 11 may comprise the receiving device 6 and the signal processing means 7.

Figure 6:
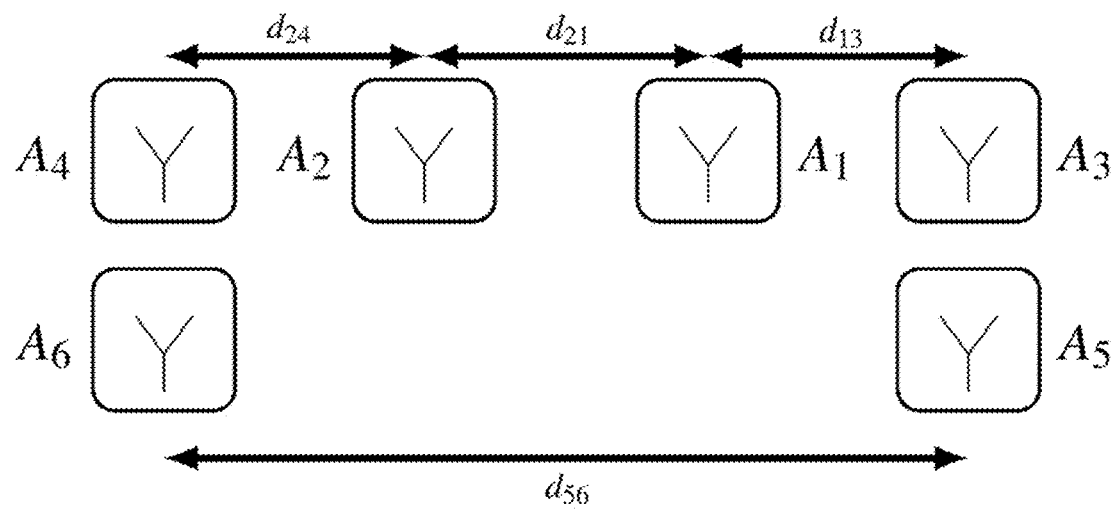
FIG. 6 shows a simplified schematic representation of the distances between the antennas and its neighboring antennas.

FIG. 6 shows a simplified schematic representation of the distances between the antennas and their neighboring antennas. In this embodiment, six antennas A1 to A6 are shown with the corresponding distances $d_{ij}$, with i,j denoting the relevant antenna A1 to A6. PCB antennas may be used to keep costs down. The present embodiment uses the frequencies of 2.4 GHz and 868 MHz. The antennas are mounted so that clear measurements of the angle of arrival are possible in both frequency bands used. The low frequency band around 868 MHz has a wavelength of λ≈34.5 cm. The high frequency band around 2.4 GHz has a wavelength of λ≈12.2 cm. This means that the distances $d_{ij}$ can be chosen in such a way that multiple measurements in the frequency bands are possible. Thus, it is advantageous if a distance $d_{ij}$ between at least two of the antennas A1 to A6 corresponds to at least half the wavelength λ of at least one incoming signal. The distance between the antennas A5 and A6 can be selected, for example, with $d_{56}$=17.25 cm, which corresponds to half the wavelength of the high frequency band around 2.4 GHz. The angle of arrival may correspondingly be calculated for 2 antennas by $$\psi_{ij} = \arcsin\left(\frac{\Delta \varphi_{ij} \cdot \lambda}{\pi \cdot \Delta d}\right),$$

with Δd=$d_{ij}$.

Figure 7:
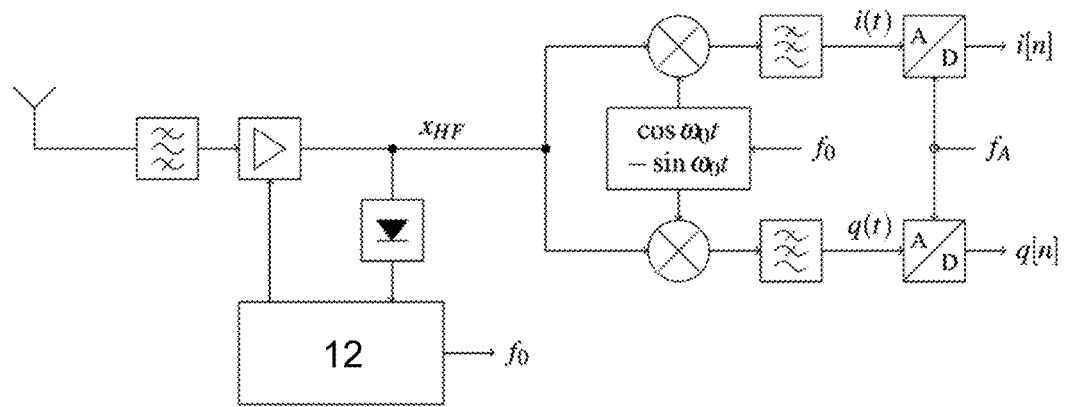
FIG. 7 shows a block diagram of a direct-conversion receiver.

FIG. 7 shows a block diagram of a direct-conversion receiver as it is provided in the device 1. The direct-conversion receiver includes a band pass filter upstream from the IQ demodulator, which pre-selects the band, and a programmable amplifier. Two analog-to-digital converters (ADCs) are inserted downstream from the IQ demodulator, one each for the in-phase signal and the quadrature signal. The control unit 12 sets the receiver to a carrier frequency by setting the frequency of the local oscillator $f_0$ accordingly.

Figure 8:
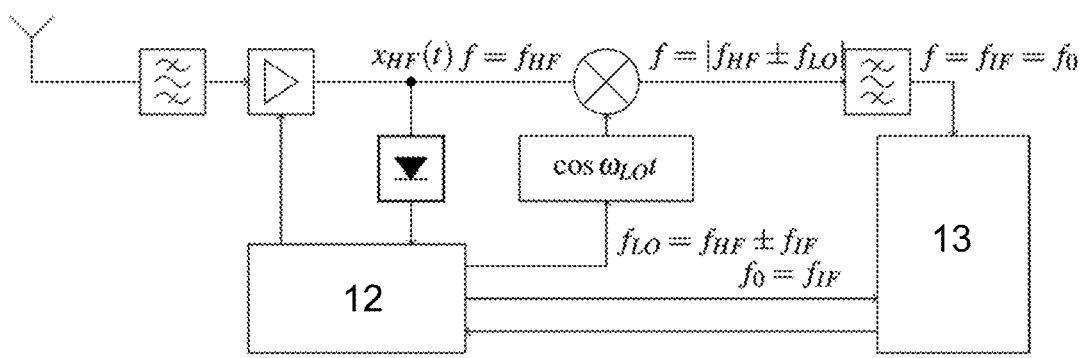
FIG. 8 shows a block diagram of a superheterodyne receiver.

On systems configured as a system-on-a-chip, superheterodyne receivers as shown in FIG. 8 may be used. The $x_{HF}$ signal is first mixed down to a lower frequency $f_{IF}$ and is subsequently demodulated. The reason for this is that the maximum possible carrier frequency $f_0$ is limited by the required accuracy of the IQ demodulator and may not be guaranteed at higher frequencies.

Figure 9:
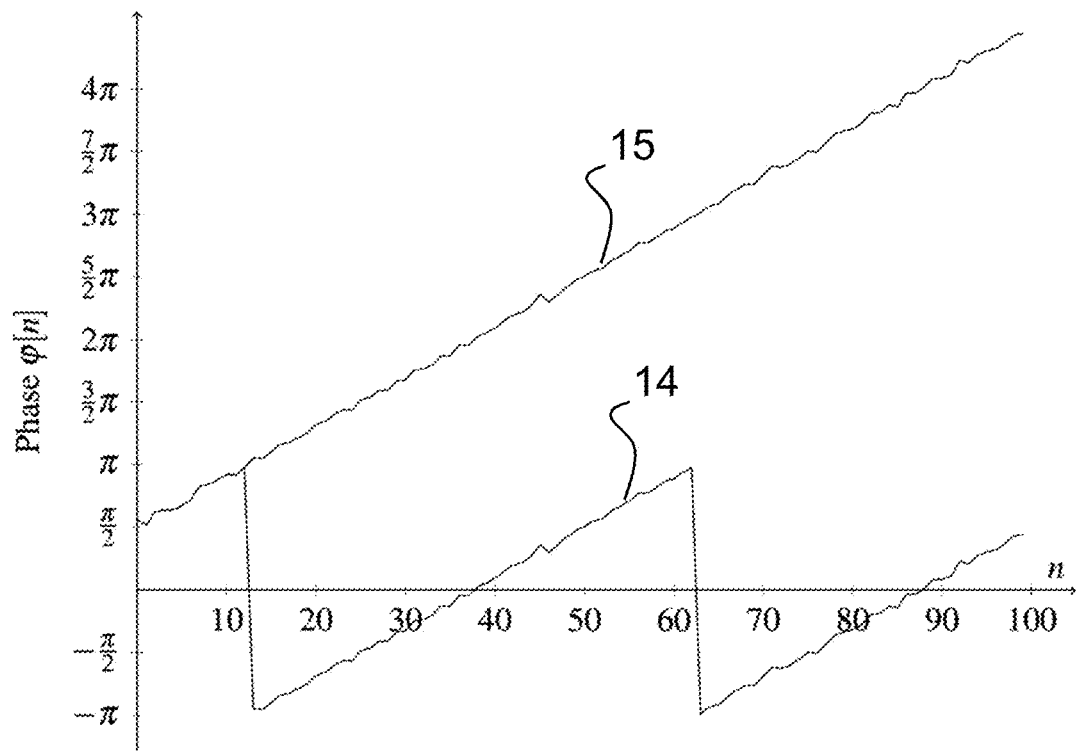
FIG. 9 shows a simplified schematic representation of the phase of a baseband signal without and with an unwrapped phase.

FIG. 9 shows the phase of a baseband signal. An unwrapping algorithm converts the phase without unwrapping 14 to the phase with unwrapping 15. The conversion may, however, cause problems with discontinuities, such as those caused by the wrapping properties of the arctan 2-function.

An unwrapping algorithm may therefore be used, which detects and eliminates the discontinuities in the phase. Phase jumps around $-2\pi$ are thus detected and corrected accordingly by adding $2\pi$ to the following samples of the phase.

LIST OF REFERENCE SIGNS

1 Device
2 Mobile transmitter
3 Central processing unit
4 Server
5 Switching means
6 Receiving device
7 Signal processing means
8 Toggle switch
9 Impedance adjustment
10 Arrangement
11 System-on-a-chip
12 Control unit
13 Direct conversion receiver
14 Phase without unwrapping
15 Phase with unwrapping
$t_z$ Cycle time
A Antenna

The invention claimed is:

1. Method of measuring an angle of arrival (AOA) of an incoming signal; the method comprising:
providing m separate antennas, where m is an integer greater than one, and a single receiver and a switch, wherein the incoming signal as received by the antennas is fed into the single receiver via the switch,
the switch comprising an electronic signaller for sequentially supplying the incoming signal, as received at the m antennas, to the receiver by switching between said m antennas,
wherein a sampling of the incoming signal as received at the m antennas is performed in repetitive cycles with a sampling rate and cycle time,
the receiver comprising a generator for generating a baseband signal having an in-phase component and a baseband signal having a quadrature component from the incoming signal and for forwarding each baseband signal to an analog-to-digital converter to provide digitized samples for each of the m antennas during each cycle;
providing a signal processor coupled to the respective analog-to-digital converter to analyze the digitized signals and to determine the angle of arrival of the incoming signal;
wherein the sampling rate of the signal processor is smaller than the number of m antennas multiplied by a minimum sampling rate, which is necessary to reconstruct the incoming signals of the individual m antennas;
wherein the incoming signal supplied to the receiver comprises a phase error;
compensating for the phase error by multiple sampling of at least one antenna and signal processing by a statistical method; and
wherein the statistical method comprises using a uniformly best unbiased estimator.

2. Method according to claim 1, wherein a phase unwrapping is performed in the signal processor.

3. Method according to claim 1, wherein the incoming signals comprise different frequencies, wherein the frequencies are outside coherence bandwidths.

4. Method according to claim 3, wherein the frequencies differ by at least a factor of 2, with the frequencies being outside the coherence bandwidths.

5. Method according to claim 1, wherein a distance d between at least two of the m antennas corresponds to at least half the wavelength of at least one incoming signal.

6. Method according to claim 1, wherein the electrical length of the m antennas differ from each other and wherein a compensation of the different electrical lengths of the m antennas is performed in the signal processor.

7. Method according to claim 1, wherein an estimate of the angle of arrival is provided for measuring an angle of arrival (AOA) for at least 2 of the m antennas.

8. Method according to claim 7, wherein the estimate of the angle of arrival comprises the least-squares method.

9. A device operated according to the method according to claim 1; the device comprising:
m separate antennas, wherein m is an integer greater than one;
a switch; and
a receiver.

10. Device according to claim 9, wherein the device is operated by a self-sufficient energy source.

11. Device according to claim 9, wherein the device is part of a real-time localization system.

12. Device according to claim 9, wherein the device comprises a system-on-a-chip (SoC), which comprises the receiver and/or the signal processor.

13. Arrangement comprising the device according to claim 9, and a central data processing unit, the central processing unit evaluating the determined angles of arrival;
wherein the arrangement is adapted for locating at least one mobile transmitter.

14. An arrangement comprising:
the device according to claim 9;
a central data processing unit evaluating the determined angles of arrival; and
at least one mobile transmitter;
wherein the arrangement is adapted for locating said at least one mobile transmitter.

* * * * *